C. W. MARKEL.
POTATO DIGGING MACHINE.
APPLICATION FILED JAN. 16, 1909.
925,119.
Patented June 15, 1909.
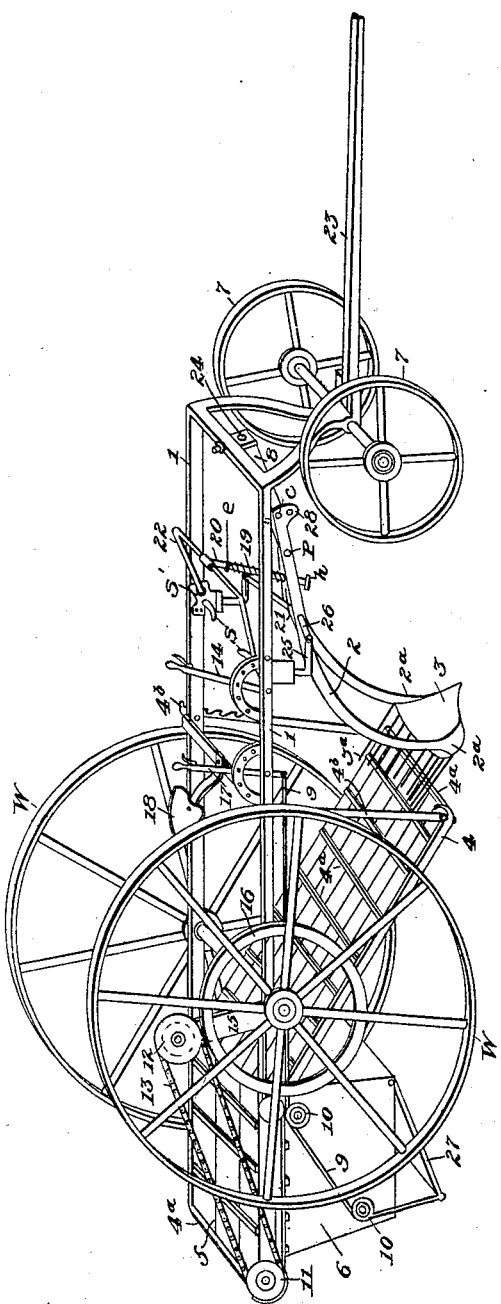
Witnesses:
W. O. Beebe
Clarence Baker
Inventor:
Clinton W. Markel
Per. H. B. Swartz Atty

UNITED STATES PATENT OFFICE.

CLINTON W. MARKEL, OF HOMERVILLE, OHIO.

POTATO-DIGGING MACHINE.

No. 925,119.  Specification of Letters Patent.  Patented June 15, 1909.

Application filed January 16, 1909. Serial No. 472,760.

*To all whom it may concern:*

Be it known that I, CLINTON W. MARKEL, a citizen of the United States, residing at Homerville, in the county of Medina and State of Ohio, have invented a new and useful Potato-Digging Machine, of which the following is a specification.

My invention relates to machines for digging potatoes. Its object is to provide a light, strong and easily operated mechanism whereby the operator may have complete control of the plow movements and actuate the same independently of the elevator mechanism; and also to provide means for gathering the dug potatoes into a receptacle separate from dirt and rubbish and dumping them in piles at the pleasure of the operator, and to make the draft lighter than heretofore. It consists of the novel means employed for suspending and shifting the plow and regulating its depth and action independently of the action of the potato elevating mechanism, and means for collecting the dug potatoes into a receptacle and discharging them therefrom, and the independent means for conveying the said elevator mechanism in relation to the plow and actuating mechanism, and means for adjusting the plow and elevator.

Referring to the accompanying drawings which illustrate my invention, the figure is a perspective view of my invention, in which ordinary drive wheels W carry a frame 1 mounted thereon and from the forward part of which is loosely suspended in a knuckle joint 24 the plow beam 8. The beam extends rearwardly and at its inner end is loosely hung upon a rod 20, and limited inwardly by the rod head $h$ and upwardly by the resilient spring 19. From this beam shanks 2 2 curve downwardly and connect with the shovel 3 along the rear side of which a series of fenders $3^a$ extend rearwardly. The forward ends of the shanks are pivotally attached at P to the beam 8 and provided with heads 28 having pin holes $c$ adapted to register with a perforation in the beam, thereby affording means for shifting the direction of the shovel 3 and so regulating its general depth. The rod 20 is pivotally attached to a frame or standard 22 which is substantially U-shaped and pivotally connected to opposite sides of the frame in bearings S'. The spiral spring 19 is upwardly limited by a collar $e$ while its lower end rests upon the beam 8. A hand lever 14 in operative engagement with said frame is adapted to raise and lower said frame and thereby increase the tension of said spring 19 upon the plow beam, or, by movement in the opposite direction elevate the plow. A seat 18 is provided for the operator, and stirrups $s$ whereby lateral movement may be given to the plow by means of the crank shaft 25 and rod 26 in operative connection with said stirrups and shanks from each side of the frame 1. By means of an opening 21 at the rear end of the beam 8 through which the vertical rod 20 loosely passes, and spring 19 in connection with hand lever 14, vertical action of the plow is regulated, while by means of the stirrups and connected mechanism aforesaid the lateral movement of the plow is constantly under control of the operator. A tongue 23 is pivotally attached to the forward trucks 7, which carry the forward part of the frame 1.

From the rear part of the frame which is supported by wheels W is suspended a carrier 4 on which is mounted a conveyer web $4^a$ which is driven by a toggle chain 13 in operative engagement with a gear wheel 16 attached to a drive wheel W and a pinion wheel 12 which is adjustable on a vertical bar 15 to afford means for tightening the said chain over the pinion 11 at the outer end of the conveyer. The carrier extends downwardly and forwardly to a point under the plow fenders $3^a$, and is vertically adjustable by means of the lateral supports $4^b$ upon the machine frame.

Heretofore carriers have been made in solid connection with the plow, thereby preventing to considerable extent its freedom of action and increasing the draft and weight upon the neckyoke. One of the chief objects of my invention is to remedy this by separating the plow from the carrier, and providing means for easy lateral and vertical adjustment of the plow, to thereby remove the weight of the carrier from the plow, and enable the operator to control the plow action in both directions effectively and with greater ease. This object is accomplished by mounting the carrier separately from the plow, and providing the means aforesaid for controlling each member independently of the other.

A potato receptacle 6 is suspended from the rear end of the carrier 5 which is provided with openings to permit the potatoes to fall through by gravity as the web is actuated, while the rubbish, if any, is carried over the receptacle to fall on the ground behind the machine. The receptacle 6 is provided with a hinged bottom 27, which is opened and closed by means of a cable 9 which passes over pulleys 10 to the controlling hand lever 17, whereby the accumulated potatoes may be dumped in a pile on the ground at pleasure of the operator. A suitable sieve forms the bottom of the carrier affording means for the escape of earth and gravel as the carrier web 4ª is actuated. The different parts of my machine may of course be modified without departing from the spirit of my invention.

Having thus fully described my invention, what I claim as new and desire to secure by Letters Patent is:—

1. A potato digging machine, comprising the combination with a wheeled vehicle and frame, of a vertically adjustable shovel-plow, the upper end of the beam thereof being hinged to the forward part of said frame, and said beam intermediately suspended from an adjustable bar and supports hinged on said frame, and the shovel of said plow provided with a series of rearwardly projecting fenders; a carrier, provided with a screen, supported on said frame independently of said plow, a web on said carrier operative under said fenders and rearwardly to the end of said frame, operating gear for said web, and a receptacle mounted under the outer end of said carrier, and means for discharging said receptacle, substantially as set forth.

2. In a potato digging machine, the combination with a wheel supported frame, of a shovel-plow suspended therefrom on a beam adapted to vertical and lateral adjustment, means for adjusting said plow vertically and laterally, a series of fenders projecting from said plow rearwardly, a carrier and web mounted on said frame in operative relation to said plow, means for actuating said web under said fenders and over said carrier frame, means for mounting and adjusting said carrier and web independently of the adjustment of said plow; a potato receptacle in connection with said carrier and web, means for transferring the dug potatoes from said plow to said web, and means for discharging said receptacle, substantially as set forth and for the purpose specified.

3. In a potato digging machine, the combination with a wheel supported frame, of a shovel plow adjustably suspended therefrom, a vertically adjustable U-shaped standard, a rod pivotally secured to said standard, and loosely engaging the inner end of the plow beam, a spring mounted on said rod and adapted to adjustably limit the vertical movement of said plow beam, a hand lever mounted to actuate said standard vertically, a seat, stirrups adjacent said seat adapted to actuate said plow beam laterally by rods connected thereto and to said stirrups respectively, a carrier frame mounted on said frame independently of said plow, fenders on said plow extending over the lower end of said carrier, a web on said carrier frame, means for actuating said web, means for adjusting said carrier in relation to said fenders, a receptacle, a hinged bottom to said receptacle, and means including a cable and hand lever to control said bottom, substantially as set forth and for the purpose specified.

In witness whereof, I have hereunto set my hand in the presence of two witnesses.

CLINTON W. MARKEL.

Witnesses:
C. C. NAUSEL,
E. J. NAUSEL.